US008631316B2

(12) United States Patent
Patrawala et al.

(10) Patent No.: US 8,631,316 B2
(45) Date of Patent: Jan. 14, 2014

(54) SYSTEMS AND METHODS FOR GENERATING SITELETS USING INFORMATION ASSETS

(75) Inventors: Zakir Patrawala, Atlanta, GA (US); Robert K. Rebb, Rochester Hills, MI (US); Samira Virani, Johns Creek, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 118 days.

(21) Appl. No.: 12/895,317

(22) Filed: Sep. 30, 2010

(65) Prior Publication Data

US 2012/0084629 A1    Apr. 5, 2012

(51) Int. Cl.
*G06F 17/00*    (2006.01)

(52) U.S. Cl.
USPC ......................................... 715/205; 715/206

(58) Field of Classification Search
USPC ....................................................... 715/205
See application file for complete search history.

(56) References Cited

U.S. PATENT DOCUMENTS

| 7,454,461 | B2* | 11/2008 | Punaganti Venkata et al. ............... 709/203 |
| 2007/0198526 | A1* | 8/2007 | Pitkow ........................... 707/10 |
| 2009/0172773 | A1* | 7/2009 | Moore ............................. 726/1 |
| 2009/0259628 | A1* | 10/2009 | Farrell et al. ...................... 707/3 |
| 2010/0161547 | A1* | 6/2010 | Carmel et al. ................... 706/59 |
| 2011/0137894 | A1* | 6/2011 | Narayanan et al. ........... 707/723 |

* cited by examiner

*Primary Examiner* — Laurie Ries
*Assistant Examiner* — Zaida I Marrero
(74) *Attorney, Agent, or Firm* — Hartman & Citrin LLC

(57) ABSTRACT

A definition of an information category a user wishes to publish to the Internet is received from a user. At least one information asset comprising a link to an information data object is received and assigned to the information category. Sitelet generation parameters are received from the user, including a sitelet category comprising the information category, and optionally, other sitelet generation parameters such as data feed types and additional information categories. A sitelet is then generated using the sitelet category and any other supplied sitelet generation parameters. The sitelet comprises a data feed of a first data feed type comprising a representation of the information assets assigned to the sitelet category and any additional information categories. The data feed type can be in any standard format, such as RSS or ATOM, or any custom format, such as iFrame HTML, XML or JSON. If the user specifies more than one data feed type, sitelets are generated for each data feed type.

14 Claims, 8 Drawing Sheets

SYSTEMS AND METHODS FOR GENERATING SITELETS USING INFORMATION ASSETS

FIELD OF THE TECHNOLOGY

At least some embodiments disclosed herein relate, in general, to systems that publish information over the Internet, and more particularly, systems that publish data feeds over the Internet.

BACKGROUND

The Internet provides a vehicle for individuals, corporations, and other types of organizations to publish information that may be of interest to a wide audience. For example,
- restaurants may wish to publish their menu to potential diners;
- car dealers may wish to advertise coupons and promotions;
- local newspapers may wish to publish headlines;
- art galleries may wish to showcase new collections;
- video stores may wish to promote new releases;
- organizations and churches may wish to produce blogs.

One method of publishing such information to the Internet is via sitelets. As the term is used herein, sitelets are data feeds that can utilize either industry standard formats such as RSS, ATOM or non-standard custom formats such as, for example, iFramed HTML, XML, or JSON.

BRIEF DESCRIPTION OF THE DRAWINGS

The embodiments are illustrated by way of example and not limitation in the figures of the accompanying drawings in which like references indicate similar elements.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The present disclosure relates to systems and methods that enable individuals, corporations, and other types of organizations to publish information to the Internet via sitelets.

Figure 1:
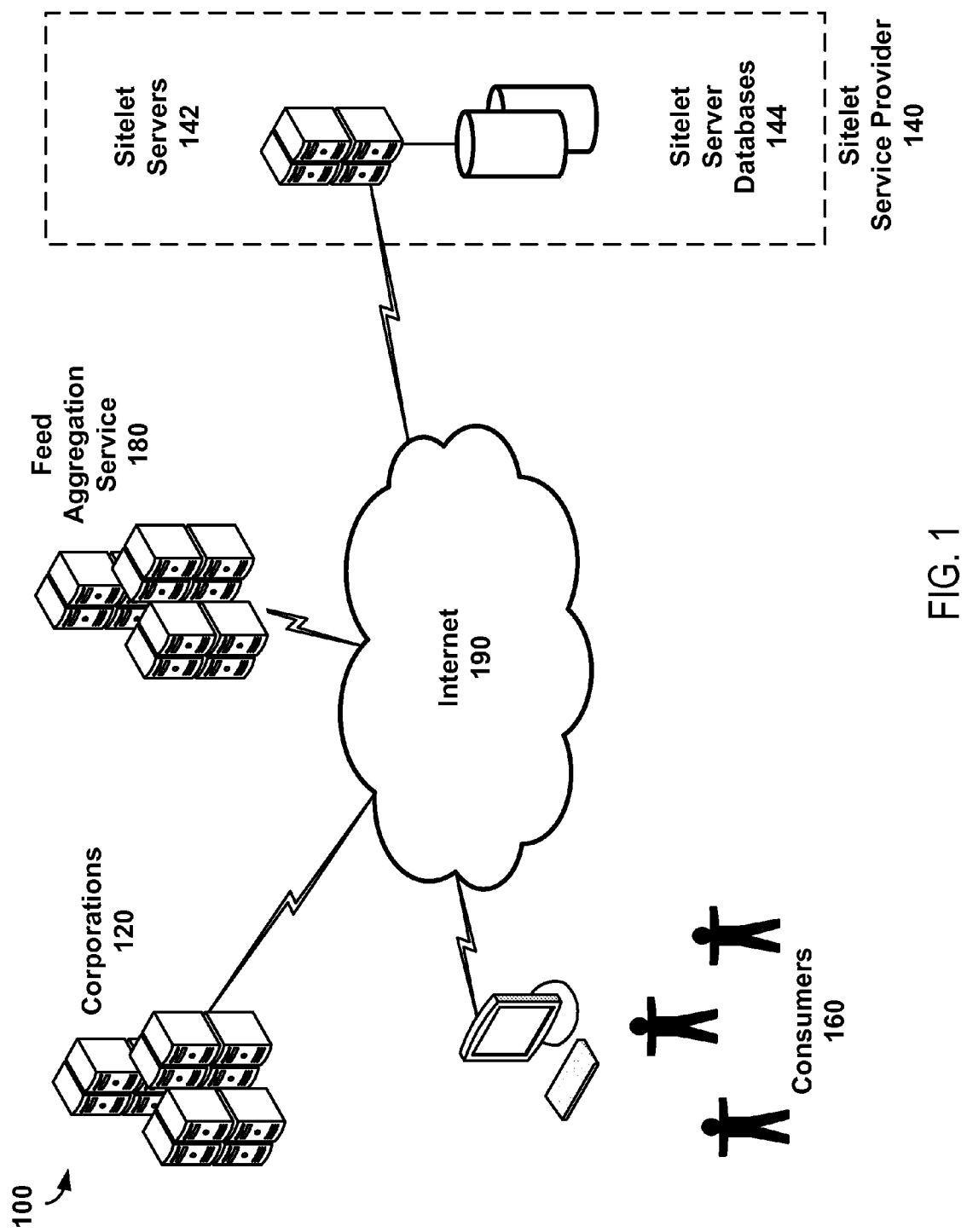
FIG. 1 illustrates a high-level view of one embodiment of a system for building and publishing sitelets.

FIG. 1 illustrates a high-level view of one embodiment of a system for building and publishing sitelets. In the normal course of business, corporations 120 develop information assets using, for example, corporate information systems. Information assets can be broadly defined as objects comprising digital information relating to one or more topics or activities, such as, for example, images, videos, audio files, spreadsheets, PDFs, and/or Word documents relating to advertisements, promotions, news and/or consumer information. The corporations 120 may wish to publish such information assets to the Internet for the purpose of, for example, generating new business or providing information to the corporation's existing customers.

In one embodiment, a sitelet service provider 140 provides sitelet services to enable corporations 120 to publish information assets over the Internet 190 in the form of sitelets directed to, for example, other corporations, individual consumers 160 and/or feed aggregation services 180. In one embodiment, the sitelet service provider 140 has one or more servers 142 and databases 144 that support sitelet development and publication services. In one embodiment, the sitelet servers 142 provide a user interface, accessible over the Internet, to enable users to define and upload individual information assets, define information categories for information assets and categories, and define sitelets using information categories. In one embodiment, the sitelet servers 142 further provide automated processing to generate and publish sitelets using such sitelet definitions and information assets.

It should be understood that the above configuration is purely exemplary, and that other configurations are possible. For example, the sitelet servers 142 and sitelet server databases 144 could be owned and controlled by a corporation 120.

Figure 2:
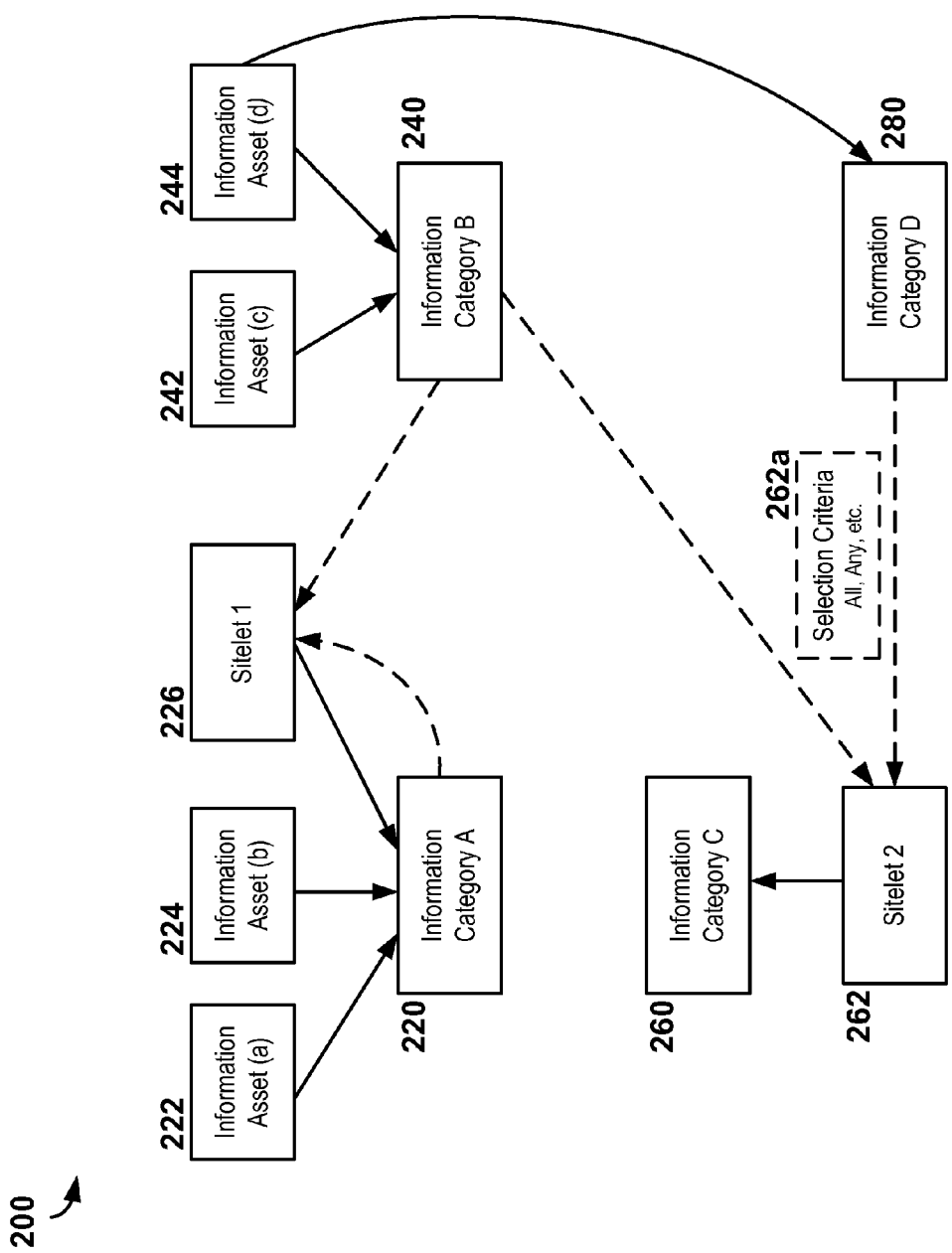
FIG. 2 illustrates one embodiment of an information model for sitelet definitions.

FIG. 2 illustrates one embodiment of an information model 200 for sitelet definitions used in various embodiments of the disclosed system and method. Data within the system is organized using information categories 220, 240, 260 and 280. In one embodiment, information categories represent a logical view of data relating to the business and its operations and can be regarded as containers for related objects. Such information categories could relate to, for example, a menu at a restaurant, promotions at a car dealership, headlines in a newspaper, or art collections at an art gallery.

In one embodiment, information assets 222, 224, 242 and 244 are each assigned to one or more information categories. For example, in the illustrated embodiment, assets 222 and 224 are assigned to information category A 220, and assets 242 and 244 are assigned to information category B 240, and asset 244 is additionally assigned to information category D. An information category need not have any information assets assigned to it, as shown, for example, for category C 260. Note that the categorization of information assets in the information model 200 may be different from the categorization of such assets in corporate information systems. For example, a restaurant may organize its menu as "Breakfast," "Brunch," "Lunch," "Dinner," "Appetizers," "Chefs Picks,"

"Seafood" and so forth, but may create categories for publishing such as "Weekday-menu," "Weekend-specials," "Christmas-feast."

In one embodiment, sitelets 226 and 262 are each assigned to a single information category. For example, in the illustrated embodiment, sitelet 1 226 is assigned to information category A 220 and sitelet 2 262 is assigned to information category C 260. An information category need not have any sitelets assigned to it, as shown, for example, for categories B 240 and D 280. By implication, when a sitelet is assigned to an information category, all information assets assigned to that information category are incorporated into the sitelet. Thus, for example, in the case of sitelet 1 226, information assets 222 and 224 are assigned to information category A 220 and are thus incorporated into sitelet 1.

In one embodiment, additional information categories may be assigned to a sitelet, for example, information category B 240 is assigned to sitelet 1 226 and sitelet 2 262. In one embodiment, when a category is assigned to a sitelet, all information assets assigned to that information category are incorporated into the sitelet. Thus, sitelets 1 226 and 2 262 incorporate information assets 242 and 244.

In one embodiment, where a sitelet is assigned more than one additional category, the sitelet can include category selection criteria. In the illustrated example, sitelet 2 262 includes category selection criteria 262a. In one embodiment, category selection criteria can be used to specify that assets included in the sitelet appear in some combination of the list of additional categories assigned to a sitelet. For example, sitelet 2 262 is assigned to information category C 260, and is assigned additional categories of information categories B 240 and D 280. In one embodiment, if the category selection criteria is "ANY", information assets in any of additional categories are assigned to the sitelet. In this case, information asset (c), 242, assigned to information category B 240 and information asset (d), 244, assigned to information category B 240 and D 280 are assigned to the sitelet. In one embodiment, if the category selection criteria is "ALL", only information assets in all of the additional categories are assigned to the sitelet. In this case, only information asset (d), 244, assigned to both information category B 240 and D 280 is assigned to the sitelet.

While the illustrated embodiment shows a limited number of categories, information assets and sitelets, it should be understood that the information model 200 can support any number of such entities.

Figure 3:
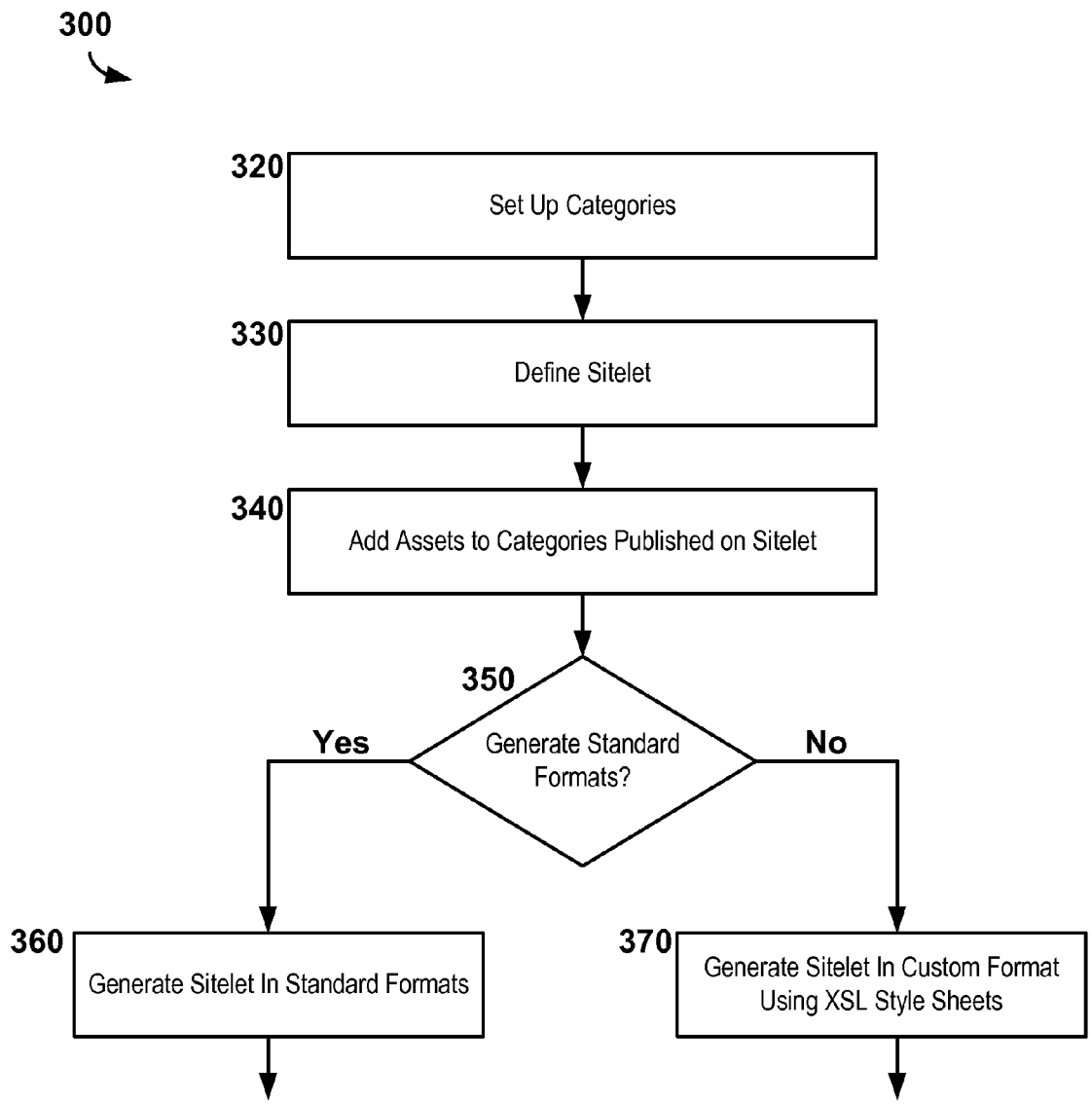
FIG. 3 illustrates one embodiment of a process for making information available over the Internet using sitelets.

FIG. 3 illustrates one embodiment of a process for making information available over the Internet using sitelets. In one embodiment, one or more sitelet servers such as shown in FIG. 1 provide the user interfaces and automated processing described below.

Figure 4:
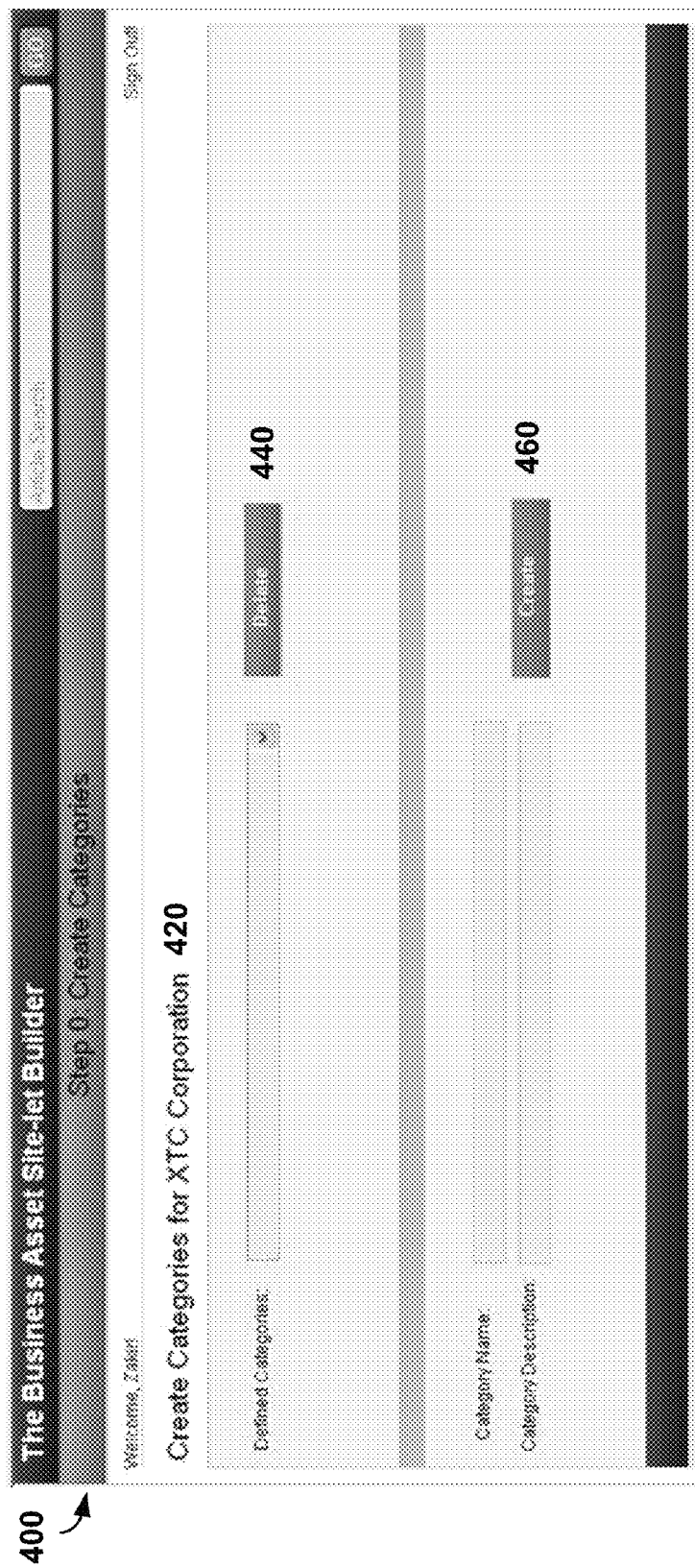
FIG. 4 illustrates one embodiment of a user interface that enables a user to delete and add categories.

In block 320 of FIG. 3, a user sets up one or more information categories. FIG. 4 illustrates one embodiment of a user interface 400 that allows a user to delete 440 and add 460 categories. In one embodiment, an information category is a free form text string that describes a category of information such as, for example "Weekday-menu." The user will typically choose categories that are relevant to the user's information assets and the feeds to be published. Note that in the illustrated embodiment, the user interface displays the name of the corporation 420 for which the categories are being created. In one embodiment, if the sitelet services are provided by a third party, such as shown in FIG. 1, the sitelet service can provide a secure login (not shown) to allow the user to log into the sitelet service and identify his or her corporate affiliation.

Figure 5:
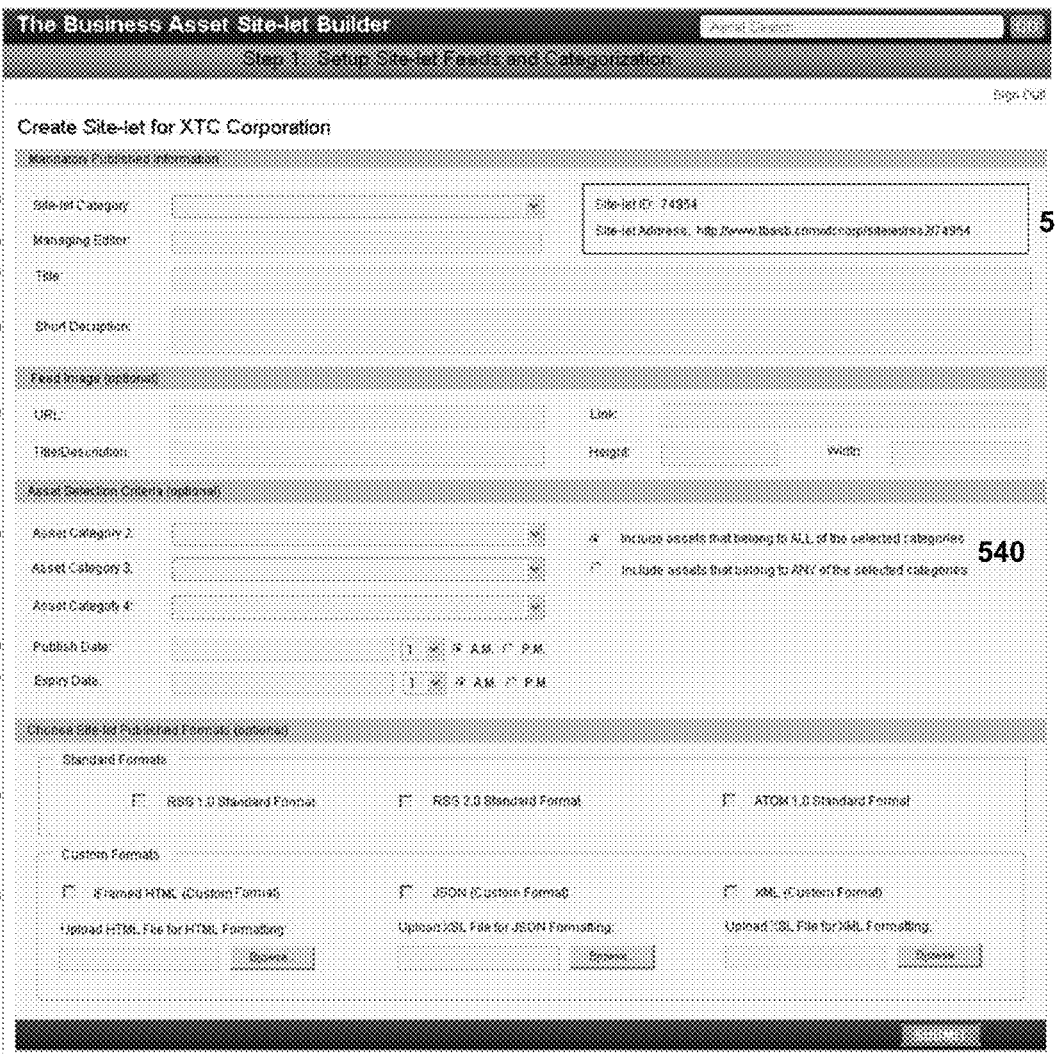
FIG. 5 illustrates one embodiment of a user interface that enables a user to set up a sitelet.

In block 330 of FIG. 3, the user then defines a sitelet using one or more of the information categories set up in block 320. FIG. 5 illustrates one embodiment of a user interface 500 that enables the user to set up a sitelet. In one embodiment, the sitelet service automatically assigns an ID to the sitelet and creates a URL to access the sitelet 505. In one embodiment, the user interface 500 enables a user to assign a main category 510 to the sitelet. The sitelet service automatically includes all unexpired information assets assigned to this information category (if any) in the sitelet when the sitelet is generated. In one embodiment, the user interface 500 enables a user to assign an editor 515, a title 520 and a description 525 to the sitelet. In one embodiment, the user interface 500 enables the user to assign a optional description and an image to the sitelet that identifies the feed 530.

In one embodiment, the user interface 500 enables more complex asset selection criteria 535 for assets in multiple categories. In one embodiment, category selection criteria 535 enables the user to select up to 3 additional categories for the sitelet, although it is understood that in other embodiments, a sitelet could be assigned any number of categories. In one embodiment, additional category selection criteria 540 enable a user to instruct the sitelet service to include information assets belonging to all of a set of categories or any of a set of categories in the sitelet. In one embodiment, additional category selection criteria allow the user to include more complex asset selection criteria by adding logical operators such as AND, OR, NOT, IN, SET, EQUAL, ALL, NONE (not shown). For example, a restaurant may define a sitelet for "Chefs-Dinner-Special" to include menu items that belong to "Chefs-Special" AND "Dinner" categories.

In one embodiment, the user interface 500 enables a user to instruct the sitelet service to publish information assets having active dates within a specific date range, publication date 545 and/or expiration date 550. For example, a Holiday-Coupons sitelet may select information assets whose published date and expiry date fall in the month of November (Nov. 1, 2010) and December (Dec. 31, 2010). In one embodiment, the user interface 500 additionally allows the user to specify the sort order of information assets in the sitelet and numbering of the assets in the sitelet (not shown).

In one embodiment, the user interface 500 enables the user to select one or more formats 555 and 560 for sitelet publication. Such formats could include standard publication formats 555, for example, RSS 1.0, RSS 2.0 and ATOM standard formats. Such formats could include non-standard publication formats 560 such as iFramed HTML, JSON and/or XML. In one embodiment, the user interface 500 enables the user to specify formatting for non-standard feeds 560, for example, by uploading for example, XSL style sheets for iFramed HTML, JSON or XML feeds.

In one embodiment, if the user does not choose a publication format, a default publication format is selected by the sitelet service (e.g. RSS 2.0). In one embodiment, if the user chooses multiple formats, the sitelet service generates a sitelet for each format and provides a unique URL for each. For example, if the user selects all of the format types in the illustrated embodiment, the sitelet service generates the following URLs:

http://www.tbasb.com/xtccorp/sitelet/rss2/74954
http://www.tbasb.com/xtccorp/sitelet/rss1/74954
http://www.tbasb.com/xtccorp/sitelet/atom10/74954
http://www.tbasb.com/xtccorp/sitelet/htm1/74954
http://www.tbasb.com/xtccorp/sitelet/xml/74954
http://www.tbasb.com/xtccorp/sitelet/json/74954 where "http://www.tbasb.com" is a domain name for a sitelet service, "xtccorp" refers to the corporation defining the sitelet, "sitelet" is a constant, "rss2," "rss1," "atom10," "html," "xml" and "json" are the respective publication formats and "74954" is the sitelet ID.

It should be understood that the formats shown on the user interface are illustrative and not limiting, and that in other embodiments, the system could support any other type of publication formats now known, or later to be developed.

Figure 6:
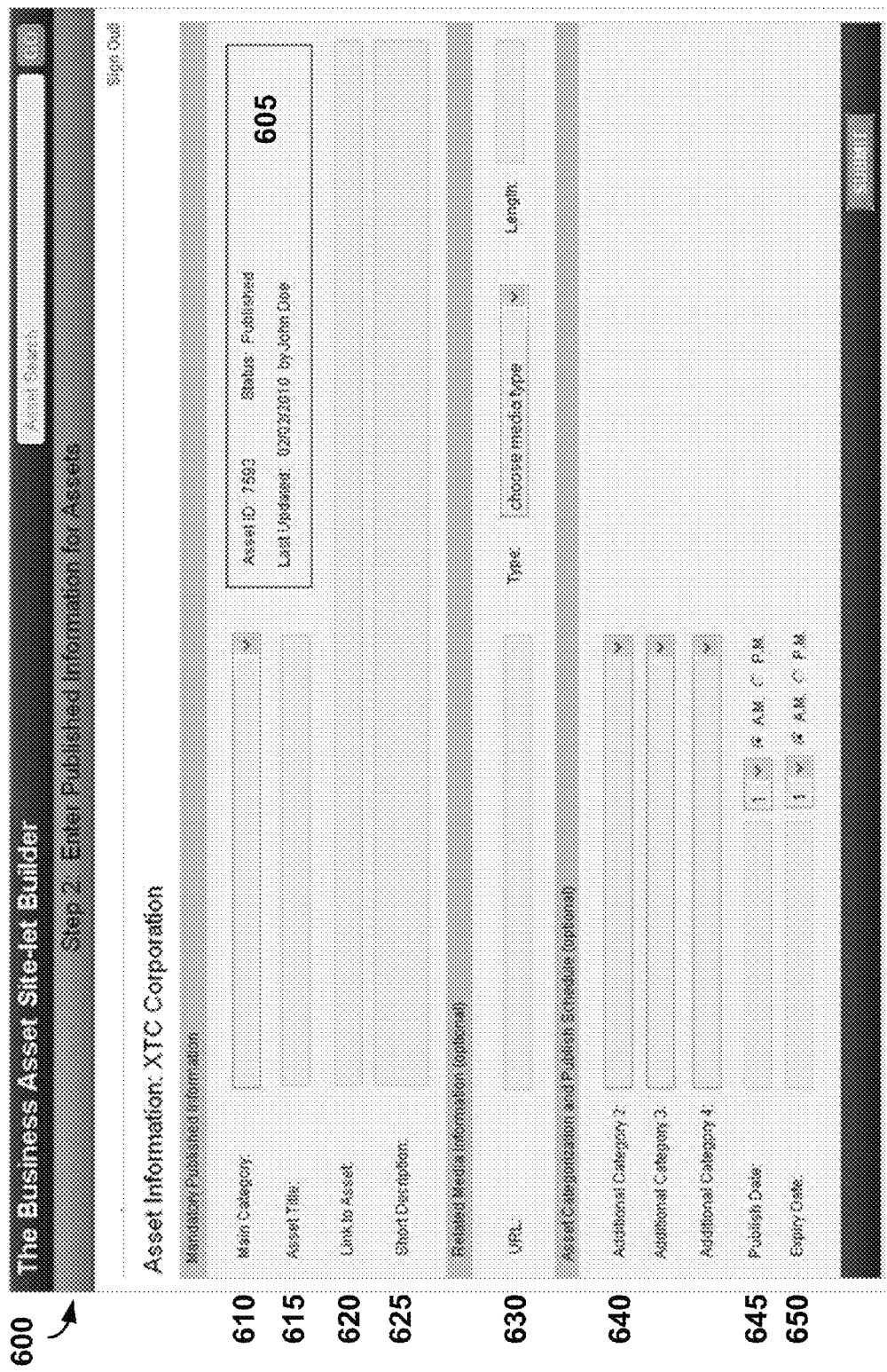
FIG. 6 illustrates one embodiment of a user interface that enables a user to define assets.

In block 340 of FIG. 3, information assets are then added to one or more of the information categories published by the sitelet (i.e. the main sitelet category and any additional categories). FIG. 6 illustrates one embodiment of a user interface 600 that allows a user to define assets. In one embodiment, the sitelet service automatically assigns an asset ID 605 to the asset. In one embodiment, a main information category 610 is assigned to the asset. In one embodiment, the user interface 600 enables the user to define a title for the asset 615, provide a description for the asset 625, and optionally, provide a URL to related media.

In one embodiment, the user interface 600 enables the user to provide an external link 620 to a source file for the information asset. In one embodiment, the sitelet service uses the link to upload a source file for the asset from a user's computer system. In one embodiment, such a source file is uploaded when the sitelet is generated. In one embodiment, the source file is uploaded when the asset is defined. In one embodiment, the user interface 600 enables the user to assign the asset to multiple information categories 640. For example, in the illustrated embodiment, the user can assign the asset to a maximum of 4 categories. In one embodiment, the user interface 600 enables a user to specify that an asset should be published on or after a specific date 645 and will expire on a specific date 650.

In one embodiment, the user can use the user interface 600 to update, as well as add, information assets. In one embodiment, the system can additionally accept information asset additions and updates via automated file uploads.

Figure 7:
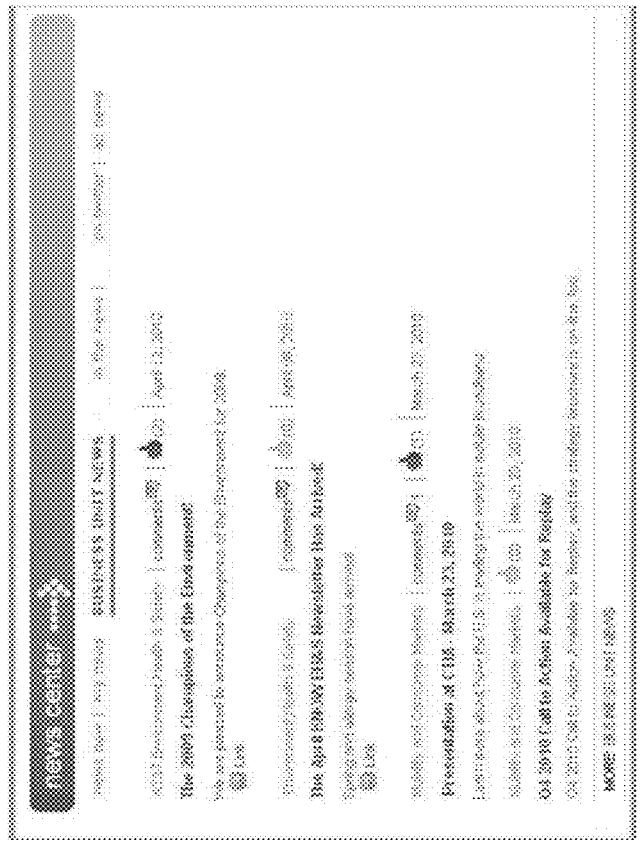
FIG. 7 illustrates two examples of generated sitelets.
Figure 7:
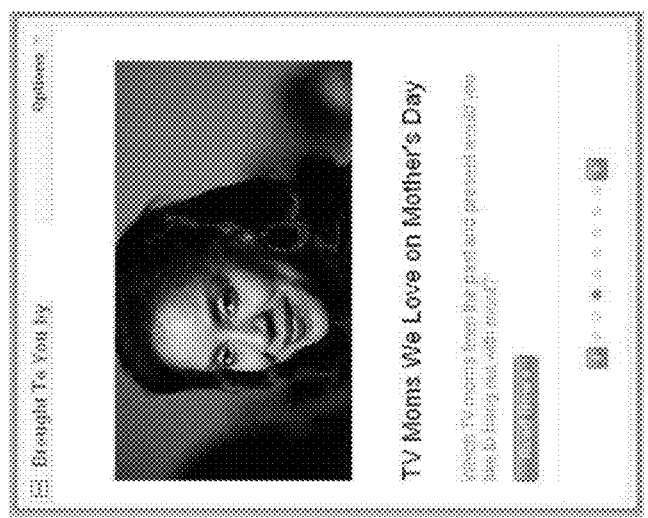

In block 350 of FIG. 3, in one embodiment, the system determines if the sitelet definition specifies that data feeds generated using the sitelet definition are in standard format or custom format. If the sitelet definition specifies standard formats (350, Yes), the system generates the sitelet in one or more standard formats (e.g. RSS and/or ATOM format) as shown in block 360 of FIG. 3. If the sitelet definition specifies non-standard formats (350, No), the system generates the sitelet in one or more non-standard formats (e.g. iFramed HTML, JSON and/or XML) using XSL style sheets as shown in block 370 of FIG. 3. In one embodiment, the system can generate a sitelet in both standard and non-standard formats. In one embodiment, the system selects information assets using the sitelet definition and generates sitelets to include a representation of the information data objects linked to such information assets. FIG. 7 illustrates two examples of generated sitelets 720 and 740. In one embodiment, if the sitelet is generated using standard feeds, such as RSS or ATOM feeds, the sitelet service can publish such feeds to feed aggregation services.

Figure 8:
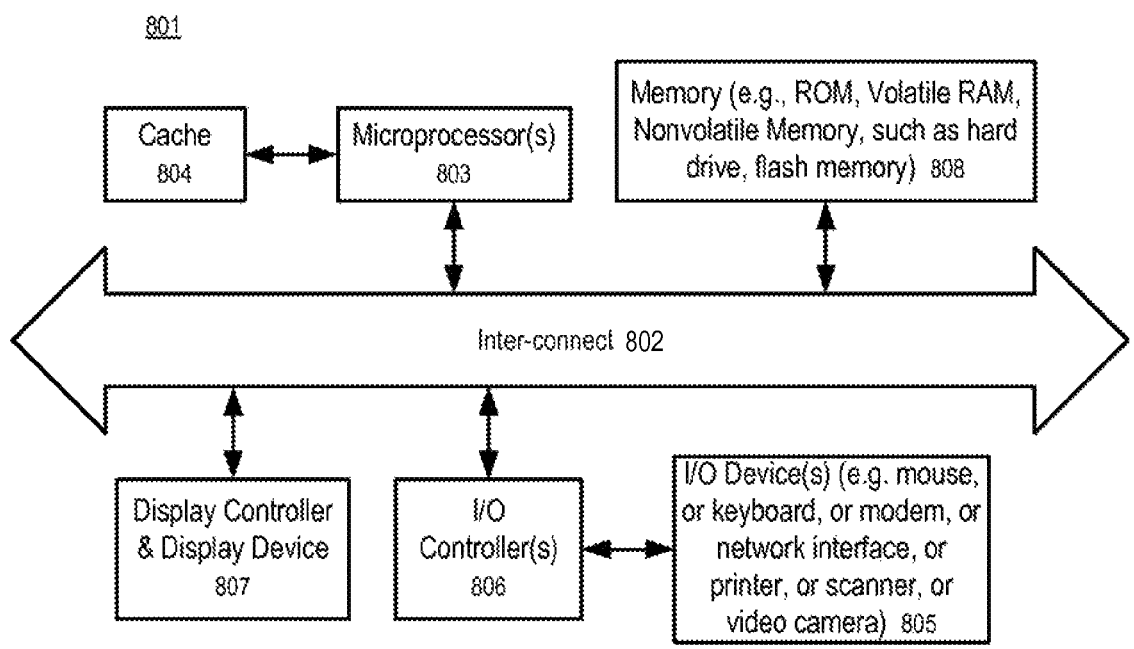
FIG. 8 shows a block diagram of a data processing system which can be used in various embodiments of the disclosed system and method.

FIG. 8 shows a block diagram of a data processing system 801 which can be used in various embodiments of the disclosed system and method. While FIG. 8 illustrates various components of a computer system, it is not intended to represent any particular architecture or manner of interconnecting the components. Other systems that have fewer or more components may also be used.

In FIG. 8, the data processing system 801 includes an inter-connect 802 (e.g., bus and system core logic), which interconnects a microprocessor(s) 803 and memory 808. The microprocessor 803 is coupled to cache memory 804 in the example of FIG. 8.

The inter-connect 802 interconnects the microprocessor(s) 803 and the memory 808 together and also interconnects them to a display controller and display device 807 and to peripheral devices such as input/output (I/O) devices 805 through an input/output controller(s) 806. Typical I/O devices include mice, keyboards, modems, network interfaces, printers, scanners, video cameras and other devices which are well known in the art.

The inter-connect 802 may include one or more buses connected to one another through various bridges, controllers and/or adapters. In one embodiment, the I/O controller 806 includes a USB (Universal Serial Bus) adapter for controlling USB peripherals, and/or an IEEE-1394 bus adapter for controlling IEEE-1394 peripherals.

The memory 808 may include ROM (Read Only Memory), and volatile RAM (Random Access Memory) and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, or an optical drive (e.g., a DVD RAM), or other type of memory system which maintains data even after power is removed from the system. The non-volatile memory may also be RAM.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In one embodiment, the sitelet servers 142 of FIG. 1 are implemented using one or more data processing systems as illustrated in FIG. 8. In some embodiments, one or more servers of the system illustrated in FIG. 8 are replaced with the service of a peer to peer network or a cloud configuration of a plurality of data processing systems, or a network of distributed computing systems. The peer to peer network, or cloud based server system, can be collectively viewed as a server data processing system.

Embodiments of the disclosure can be implemented via the microprocessor(s) 803 and/or the memory 808. For example, the functionalities described above can be partially implemented via hardware logic in the microprocessor(s) 803 and partially using the instructions stored in the memory 808. Some embodiments are implemented using the microprocessor(s) 803 without additional instructions stored in the memory 808. Some embodiments are implemented using the instructions stored in the memory 808 for execution by one or more general purpose microprocessor(s) 803. Thus, the disclosure is not limited to a specific configuration of hardware and/or software.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system, middleware, service delivery platform, SDK (Software Development Kit) component, web services, or other specific application, component, program, object, module or sequence of instructions referred to as "computer programs." Invocation interfaces to these routines can be exposed to a software development community as an API (Application Programming Interface). The computer programs typically comprise one or more instructions set at various times in various memory and storage devices in a computer, which when read and executed by one or more processors in the computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, and optical storage media (e.g., Compact Disk Read-Only Memory (CD ROMS), Digital Versatile Disks (DVDs)), among others.

In general, a machine readable medium includes any mechanism that provides (e.g., stores) information in a form accessible by a machine (e.g., a computer, network device, personal digital assistant, manufacturing tool, any device with a set of one or more processors).

In various embodiments, hardwired circuitry may be used in combination with software instructions to implement the techniques. Thus, the techniques are neither limited to any specific combination of hardware circuitry and software nor to any particular source for the instructions executed by the data processing system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method comprising:
   receiving, at a computing device via input from a user, a sitelet definition for a sitelet, the sitelet definition comprising an assignment, to the sitelet, of a first information category and a second information category of a plurality of information categories and further comprising a category selection criteria that expresses a logical relationship between the first information category and the second information category assigned to the sitelet, wherein the logical relationship indicates that information assets assigned to at least one of the first information category or the second information category are assigned to the sitelet;
   receiving, at the computing device via input from the user, an information asset and a link to an information data object;
   receiving, at the computing device via input from the user, for the information asset, an assignment of the information asset to a subset of the plurality of information categories;
   determining, by the computing device, that the information asset is assigned to the first information category and is not assigned to the second information category; and
   generating, by the computing device, the sitelet comprising a data feed, of a data feed type, the data feed comprising a representation of the information data object associated with the information asset, wherein generating the sitelet comprises applying the sitelet definition to the information asset and is based on the information asset meeting the category selection criteria of the sitelet definition by being assigned to the first information category.

2. The method of claim 1, wherein the sitelet definition additionally comprises the data feed type.

3. The method of claim 1, wherein the information asset additionally comprises a publication date, wherein the information asset is not used in the data feed until the publication date is reached.

4. The method of claim 1, wherein the information asset additionally comprises an expiration date, wherein the information asset is not used in the data feed when the expiration date has been reached.

5. The method of claim 2, wherein the data feed type specifies a standard feed format.

6. The method of claim 5, wherein the standard feed format is selected from the group consisting of: Really Simple Syndication and ATOM Publishing Protocol.

7. The method of claim 5, additionally comprising:
   publishing, using the computing device, the sitelet to a data aggregation service.

8. The method of claim 2, wherein the data feed type specifies a custom format, and the method additionally comprises receiving custom formatting information, wherein the sitelet is generated in a format specified by the custom formatting information.

9. The method of claim 8, wherein the custom format feed is selected from the list: iFramed Hypertext Markup Language, JavaScript Object Notation and Extensible Markup Language.

10. The method of claim 1, wherein the sitelet is generated without modifying the information data object.

11. A non-transitory computer readable storage medium storing instructions that, when executed by a computing device, cause the computing device to perform operations comprising:
- receiving, via input from a user, a sitelet definition for a sitelet, the sitelet definition comprising an assignment, to the sitelet, of a first information category and a second information category of a plurality of information categories and further comprising a category selection criteria that expresses a logical relationship between the first information category and the second information category assigned to the sitelet, wherein the logical relationship indicates that information assets assigned to at least one of the first information category or the second information category are assigned to the sitelet;
- receiving, via input from the user, an information asset and a link to an information data object;
- receiving, via input from the user, for the information asset, an assignment of the information asset to a subset of the plurality of information categories;
- determining that the information asset is assigned to the first information category and is not assigned to the second information category; and
- generating-the sitelet comprising a data feed, of a data feed type, the data feed comprising a representation of the information data object associated with the information asset, wherein generating the sitelet comprises applying the sitelet definition to the information asset and is based on the information asset meeting the category selection criteria of the sitelet definition by being assigned to the first information category.

12. The non-transitory computer readable storage medium media of claim 11, further comprising: receiving the first data feed type.

13. A computer system comprising:
a processor; and
a memory storing instructions that, when executed by the processor, cause the processor to perform operations comprising:
- receiving, via input from a user, a sitelet definition for a sitelet the sitelet definition comprising an assignment, to the sitelet, of a first information category and a second information category of a plurality of information categories and further comprising a category selection criteria that expresses a logical relationship between the first information category and the second information category assigned to the sitelet, wherein the logical relationship that information assets assigned to at least one of the first information category or the second information category are assigned to the sitelet;
- receiving, via input from the user, an information asset and a link to an information data object;
- receiving, via input from the user, for the information asset, an assignment of the information asset to a subset of the plurality of information categories;
- determining that the information asset is assigned to the first information category and is not assigned to the second information category; and
- generating the sitelet comprising a data feed, of a data feed type, the data feed comprising a representation of the information data object associated with the information asset, wherein generating the sitelet comprises applying the sitelet definition to the information asset and is based on the information asset meeting the category selection criteria of the sitelet definition by being assigned to the first information category.

14. The computer system of claim 13, wherein the operations further comprise receiving the data feed type.

* * * * *